United States Patent Office 3,340,929
Patented Sept. 12, 1967

3,340,929
METHOD FOR CEMENTING WELLS
Knox A. Slagle, Duncan, Okla., assignor to Halliburton Company, Duncan, Okla., a corporation of Delaware
No Drawing. Filed July 27, 1965, Ser. No. 475,260
15 Claims. (Cl. 166—29)

ABSTRACT OF THE DISCLOSURE

The patent describes a method of cementing pipe in a well traversing a producing zone which comprises placing in the annular space between the pipe and the well bore a cement slurry containing from about 5% by weight of the water in the slurry up to an amount necessary to saturate the water of a metal salt of hydrochloric or sulfuric acid, and then permitting the cement slurry to cure within the annular space. It has been found that these metal salts improve the bonding of the cement to the pipe and to the formation.

---

This invention relates to the increasing of the expansion of cementing compositions to obtain improved bonding of the cement to pipe and formations in a well.

Cementing slurries are conventionally used to secure the casing or pipe within a bore hole traversing a producing zone such as an oil well. In this process a string of pipe is first inserted in the bore hole and thereafter the cement slurry is placed out the end of the pipe or perforations therein and up the annular space between the pipe and the formation surface surrounding the bore hole to fill this space. In another method of cementing or setting casing or pipe in a well, a cementing slurry is introduced into a well bore and subsequently the pipe is placed thereinto. Normally the lower end of the pipe is sealed or plugged to keep the cement slurry from entering the pipe. Thereafter, the cement is permitted to set, and ideally to provide a tenacious bond between the cement and the pipe, and between the cement and the formation. However, it has been found that the desired bonding does not take place when the face of the formation has certain characteristics, or is of certain compositions; nor does it occur when the pipe is subjected to conditions resulting in contraction of the pipe subsequent to the cementing operation. The present invention is concerned with the use of a cement composition which will provide the desired degree of bonding to the formation and to the pipe in many of the situations where bonding difficulties and failures have previously been found to occur.

An example of a situation where poor bonding between cement and the formation has been found to occur is in subsurface shale formations. This problem has been found to be most noticeable when sloughing or heaving occurs while pumping the cement slurry past the sensitive formation. There has resulted one or more undesirable conditions including excessive wash-outs and channeling behind the pipe, lost circulation into the weakened shale structure, and annular bridging which may prevent circulation. In some cases the deterioration of the shale does not become apparent until well stimulation techniques such as acidizing or fracturing are attempted, at which time the shale formation may actually flow from one perforated interval to another. The communication channel will then exist not in the cement column but in the formation behind the sheath of cement around the pipe. Similarly, in squeeze cementing poor bonding may occur where the formations to be squeezed contain significant quantities of shale, clay, (dirty) sands, limestones or dolomites as well as interfaces between shale and other formations or shale streaks which may exist in the perforated section being sequeezed.

The present invention accordingly has as its principal object the provision of a well cementing method employing a cement slurry which upon setting will effectively bond to various problem formations such as shale.

More particularly it is an object of the present invention to provide a method of effectively increasing the expansion of cementing compositions to obtain improved bonding of the cement to the casing and of the cement to the formation in a well.

More specifically, it is an object of this invention to utilize the discovery that salt water Portland cement slurries show greater expansion upon curing to provide improved bonding of the cement to the surrounding surfaces.

These and other objects of the invention will become apparent from the more detailed description which follows.

Briefly, the present invention comprises a method of cementing casing or pipe in a well traversing a producing zone utilizing a pumpable cement slurry containing a critical effective amount, as more fully hereinafter defined, of a metal salt of hydrochloric or sulfuric acids, and thereafter permitting the slurry to cure within the annular space to provide an improved bonding of the cement to the casing and to the formation in the well.

The amount of the salt necessary to produce beneficial expansion using sodium chloride is from about 5 to 10% by weight of the water in the slurry up to the amount necessary to saturate the water with sodium chloride, about 37% by weight. The other salts are used alone or in addition to the sodium chloride. When the other salts are used alone they are employed in an amount equal to at least 5% by weight of the water in the slurry. When they are used in conjunction with sodium chloride they may be used in any amount up to about 10% by weight or more including up to saturation of the water. The invention includes the use of salt mixtures. For example, a saturated sodium chloride solution containing 5% by weight of added sodium sulfate may be used advantageously to provide greater expansion of the cured cement than when these additives are used separately.

The preferred salt for use in the practice of the present invention is sodium chloride. However, sodium sulfate, as well as calcium chloride, potassium chloride, magnesium chloride, aluminum chloride, copper chloride, zinc chloride, calcium sulfate, potassium sulfate, magnesium sulfate, aluminum sulfate, copper sulfate, zinc sulfate or any combinations thereof may also be used for the purpose of effectively increasing the expansion and bonding of cementing slurries.

The following examples are presented solely to illustrate the invention and should not be regarded as limiting the invention in any way. In the examples, the parts and percentages are by weight of water unless otherwise indicated.

Example I

Data on the linear expansion of cements were obtained by using specimens prepared by pouring comparative fresh-water and sodium chloride-saturated cement slurries in standard 1 x 1 x 6 inch bar molds. Stainless steel pins were inserted in each end for accuracy in measuring the length of the set specimens. After curing 24 hours at 80° F., these specimens were removed and measured for the relative initial lengths. The bars were then submerged in fresh water in an autoclave where 800 pounds per square inch pressure was applied for periods of 7, 28 and 60 days at which time the duplicate bars of each composition were removed, measured and returned to the autoclave.

TABLE I.—PERCENT EXPANSION IN 6" BAR AFTER CURING

| Ingredients | Water, Gals./Sack | 7 Days | 28 Days | 60 Days |
|---|---|---|---|---|
| API Class A Cement-Fresh Water | 5.2 | 0.057 | 0.073 | 0.077 |
| API Class A Cement-Saturated Salt Water | 5.2 | 0.066 | 0.100 | 0.120 |
| 50-50 Pozmix A Cement-0% Gel-Fresh Water | 4.4 | 0.036 | 0.050 | 0.055 |
| 50-50 Pozmix A Cement-0% Gel-Saturated Slat Water | 4.4 | 0.036 | 0.075 | 0.090 |
| 50-50 Pozmix A Cement-2% Gel-Fresh Water | 5.75 | 0.051 | 0.071 | 0.083 |
| 50-50 Pozmix A Cement-2% Gel-Saturated Salt Water | 5.75 | 0.048 | 0.080 | 0.095 |

The bonding strength of fresh-water cement to pipe at 140° F. was found to increase from 108 pounds per square inch after one day to 231 pounds per square inch after 28 days. In contrast thereto the bonding strength of the saturated sodium chloride water cement increased from 95 pounds per square inch after one day to 400 pounds per square inch at the end of 28 days. These results clearly indicate the advantage obtained by the use of saturated sodium chloride solutions as the liquid ingredients in cementing slurries.

Upon injection of the saturated salt water API Class A cement slurry into the annular space between a string of metal pipe and the formation in a well traversing a shale zone, the cement was found to cure and effectively bond to both the metal pipe and the shale formation.

*Example II*

Following the procedure described above, cement bars were prepared using various salt additives. After pouring, the cement specimens were permitted to cure for the indicated time with the percentage linear expansion being measured at various time intervals as indicated.

TABLE II.—API CLASS A CEMENT
[Curing conditions: fresh water—atmospheric pressure—temperature, 80° F.]

| Additive [1] | Gals./Sack | Percent Linear Expansion | | | |
|---|---|---|---|---|---|
| | | 7 Days | 14 Days | 28 Days | 3 Mo. |
| 0.0% Sodium sulfate | 5.2 | .027 | .035 | .045 | .067 |
| 0.5% Sodium Sulfate | 5.2 | .032 | .040 | .055 | .077 |
| 1.5% Sodium Sulfate | 5.2 | .023 | .030 | .044 | .075 |
| 2.0% Sodium Sulfate | 5.2 | .025 | .034 | .049 | .081 |
| 5.0% Sodium Sulfate | 5.2 | .063 | .081 | .106 | .145 |
| 7.5% Sodium Sulfate | 5.2 | .091 | .121 | .152 | .195 |
| 10.0% Sodium Sulfate | 5.2 | .097 | .131 | .169 | .244 |
| 15.0% Sodium Sulfate | 5.2 | .107 | .149 | .210 | .373 |
| 0.0% Sodium Sulfate | [2] 5.2 | .093 | .122 | .144 | .183 |
| 2.5% Sodium Sulfate | [2] 5.2 | .124 | .156 | .185 | .224 |
| 5.0% Sodium Sulfate | [2] 5.2 | .127 | .164 | .200 | .259 |
| 5.0% Sodium Sulfate plus 32.6% Potassium Chloride | 7.2 | .083 | .120 | .146 | .177 |
| 5.0% Aluminum Sulfate | [2] 5.2 | .087 | .106 | .131 | .167 |
| 5.0% Calcium Chloride | 5.2 | .086 | .102 | .121 | .145 |
| 5.0% Magnesium Sulfate | 5.2 | .077 | .089 | .103 | .131 |
| 5.0% Magnesium Chloride | 5.2 | .065 | .075 | .086 | .110 |
| Sat. Potassium Chloride | 5.2 | .062 | .079 | .100 | .134 |

[1] Percentages are by weight of cement except for sodium and potassium chlorides.
[2] Saturated Sodium Chloride Water.

*Example III*

When the foregoing procedure of Example II was duplicated using a cement containing equal amounts of Portland cement and pozzolanic material in lieu of API Class A cement, the desired linear expansion of the cement is obtained upon the usage of the salt additive as is shown in the following table.

TABLE III.—50-50 POZMIX A CEMENT
[Curing conditions: fresh water—atmospheric pressure—temperature, 80° F.]

| Sodium Sulfate [1] Percent | Percent Gel | Water, Gals./Sack | Percent Linear Expansion | | | | | |
|---|---|---|---|---|---|---|---|---|
| | | | 7 Days | 14 Days | 28 Days | 3 Mo. | 6 Mo. | 9 Mo. |
| 0.0 | 2 | 5.75 | .062 | .074 | .085 | .120 | .132 | .138 |
| 2.5 | 2 | 5.75 | .035 | .042 | .056 | .086 | T.T. | |
| 5.0 | 2 | 5.75 | .055 | .069 | .082 | .116 | T.T. | |
| 10.0 | 2 | 5.75 | .124 | .157 | .192 | .249 | .271 | .278 |
| 15.0 | 2 | 5.75 | .142 | .197 | .260 | .245 | .369 | .376 |
| 0.0 | 2 | [2] 5.75 | .057 | .070 | .902 | .130 | .151 | .157 |
| 0.0 | 2 | [3] 5.75 | .056 | .074 | .098 | .140 | .163 | .169 |
| 0.0 | 2 | [4] 5.75 | .100 | .122 | .143 | .195 | .211 | .219 |
| 10.0 | 2 | [2] 5.75 | .150 | .193 | .239 | .309 | .338 | .345 |
| 10.0 | 2 | [3] 5.75 | .163 | .207 | .245 | .303 | .325 | .330 |
| 10.0 | 2 | [4] 5.75 | .175 | .229 | .282 | .318 | .340 | .346 |
| 0.0 | 0 | 4.4 | .050 | .061 | .073 | .096 | .110 | .116 |
| 10.0 | 0 | 4.4 | .128 | .165 | .210 | .272 | .300 | .315 |
| 10.0 | 0 | [2] 4.4 | .143 | .198 | .248 | .327 | .364 | .376 |
| 10.0 | 0 | [3] 4.4 | .131 | .186 | .252 | .337 | .375 | .387 |
| 10.0 | 0 | [4] 4.4 | .123 | .183 | .259 | .354 | .397 | .410 |

[1] Percentage by weight of cement.
[2] 10% Salt Water.
[3] 18% Salt Water.
[4] Saturated Salt (Sodium Chloride) Water.
T.T. Tests Terminated.

It has been found that the salt cement used in the well cementing process of this invention minimizes shale deterioration when the cement contacts the formation. It has been found that the formation remains relatively stable after the cementing of the casing in the well, and is abe to withstand squeeze pressure, as well as acidizing, fracturing, and other well stimulation techniques.

The blending of the salt-containing cement compositions of my invention is accomplished utilizing standard mixing equipment already familiar to those skilled in the art. Accordingly, no further discussion of the blending is contained herein.

The gel material referred to in Tables I and III was bentonite.

It will be understood that many other ingredients may be present in the cement composition employed in the method of this invention. For example, in certain applications it may be desirable to use materials such as cement accelerators, pozzolans, silica flour, diatomaceous earth, cement retarders, fluid loss additives, friction reducing agents and the like. These ingredients are used in conventional amounts. For example, the pozzolans, silica flour and diatomaceous earth are used in amounts up to 25% by weight of the cement, or more, with pozzolans being used up to about 75%, silica flour being used up to about 60% and diatomaceous earth being used up to about 50%. Likewise, gelling agents such as bentonite may be used in an amount up to about 5% by weight of cement. The preferred water to cement ratio is generally from about 3 to 8 gallons of water per 100 pounds of cement; however, up to about 25 gallons of water per 100 pounds of cement may be used when necessary.

Accordingly, since many variations are possible according to the practice of this invention, it is intended that the invention be limited only by the lawful scope of the appended claims.

I claim:

1. A method of cementing pipe in a well traversing a producing zone which comprises placing into an annular space between the pipe and the well bore a pumpable Portland cement slurry containing from about 5% by weight of the water in the slurry up to the amount necessary to saturate the water of a mixture of a metal salt of hydrochloric acid and a metal salt of sulfuric acid, and thereafter permitting the slurry to cure within the annular space to provide improved bonding of the cement to the pipe and to the formation.

2. The method of claim 1 wherein the cement slurry additionally contains up to about 5% by weight of bentonite.

3. The method of claim 1 wherein the cement slurry contains cement and a pozzolanic material in equal weight amounts.

4. The method of claim 1 wherein the metal salt is magnesium sulfate.

5. The method of cementing pipe in a well traversing a producing zone which comprises placing into the annular space between the pipe and the well bore a pumpable cement slurry containing from about 5% by weight of the water in the slurry up to the amount necessary to saturate the water of sodium sulfate, and thereafter permitting the slurry to cure within the annular space to provide improved bonding of the cement to the pipe and to the formation.

6. The method of cementing pipe in a well traversing a producing zone which comprises placing into the annular space between the pipe and the well bore a pumpable cement slurry containing from about 5% by weight of the water in the slurry up to the amount necessary to saturate the water of a mixture of sodium chloride and sodium sulfate, and thereafter permitting the slurry to cure within the annular space to provide improved bonding of the cement to the pipe and to the formation.

7. The method of cementing pipe in a well traversing a producing zone which comprises placing into the annular space between the pipe and the well bore a pumpable Portland cement slurry containing from about 3 to about 8 gallons of water per 100 pounds of cement, said water containing from about 5% by weight up to the amount necessary to saturate the water of a metal salt of sulfuric acid, and thereafter permitting the slurry to cure within the annular space to provide an improved bonding of the cement to the pipe and to the formation.

8. The method of cementing pipe in a well traversing a producing zone which comprises placing into the annular space between the pipe and the well bore a pumpable Portland cement slurry containing from about 3 to about 25 gallons of water per 100 pounds of cement, said water containing from about 5% by weight up to the amount necessary to saturate the water of a metal salt of sulfuric acid, and thereafter permitting the slurry to cure within the annular space to provide an improved bonding of the cement to the pipe and to the formation.

9. The method of cementing pipe in a well traversing a producing zone having at least some shale composition which comprises placing into the annular space between the pipe and the well bore a pumpable Portland cement slurry containing from about 5% by weight of the water in the slurry up to the amount necessary to saturate the water of a metal salt of sulfuric acid and thereafter permitting the slurry to cure within the annular space to provide improved bonding of the cement to the pipe and to the shale formation.

10. The method of cementing pipe in a well traversing a producing zone having at least some shale composition which comprises placing into the annular space between the pipe and the well bore a pumpable cement slurry containing from about 5% by weight of the water in the slurry up to the amount necessary to saturate the water of sodium sulfate, and thereafter permitting the slurry to cure within the annular space to provide improved bonding of the cement to the pipe and to the shale formation.

11. The method of cementing pipe in a well traversing a producing zone having at least some shale composition which comprises placing into the annular space between the pipe and the well bore a pumpable cement slurry containing from about 5% by weight of the water in the slurry up to the amount necessary to saturate the water of a mixture of sodium chloride and sodium sulfate, and thereafter permitting the slurry to cure within the annular space to provide improved bonding of the cement to the pipe and to the shale formation.

12. The method of cementing pipe in a well traversing a producing zone having at least some shale composition which comprises placing into the annular space between the pipe and the well bore a pumpable aqueous cement slurry containing a saturated solution of sodium sulfate, and thereafter permitting the slurry to cure within the annular space to provide improved bonding of the cement to the pipe and to the shale formation.

13. The method of cementing pipe in a well traversing a producing zone which comprises placing into the annular space between the pipe and the well bore a pumpable Portland cement slurry containing from about 5% by weight of the water in the slurry up to the amount necessary to saturate the water of a salt selected from the group consisting of potassium chloride, magnesium chloride, and calcium chloride, and thereafter permitting the slurry to cure within the annular space to provide improved bonding of the cement to the pipe and to the formation.

14. A method of cementing pipe in a well traversing a producing zone which comprises placing into an annular space between the pipe and the well bore a pumpable Portland cement slurry containing from about 5% by weight of the water in the slurry up to the amount necessary to saturate the water of aluminum sulfate, and thereafter permitting the slurry to cure within the annular space to provide improved bonding of the cement to the pipe and to the formation.

15. A method of cementing pipe in a well traversing a producing zone which comprises placing into an annular space between the pipe and the well bore a pumpable Portland cement slurry containing from about 5% by weight of the water in the slurry up to the amount necessary to saturate the water of a mixture comprising sodium sulfate and potassium chloride, and thereafter permitting the slurry to cure within the annular space to provide improved bonding of the cement to the pipe and to the formation.

References Cited

FOREIGN PATENTS 805,848  12/1958  Great Britain.

OTHER REFERENCES

Carter et al.: "Expanding Cements for Primary Cementing," Journal of Petroleum Technology, May 1966, pp. 551–558 relied on.

Slagle et al.: "Salt Cement for Shale and Bentonitic Sands," Journal of Petroleum Technology, February 1963, pp. 187–194 relied on.

Uren: Petroleum Production Engineering, Oil Field Development, 4th ed. (1956), McGraw-Hill Book Co., Inc., New York, pp. 491 and 493 relied on.

CHARLES E. O'CONNELL, *Primary Examiner.*

STEPHEN J. NOVOSAD, *Examiner.*

Disclaimer 3,340,929.—*Knox A. Slagle*, Duncan, Okla. METHOD FOR CEMENTING WELLS. Patent dated Sept. 12, 1967. Disclaimer filed Nov. 20, 1968, by the assignee, *Halliburton Company*.

Hereby enters this disclaimer to claim 13 of said patent.

[*Official Gazette December 24, 1968.*]